(12) United States Patent
Borumand et al.

(10) Patent No.: US 8,443,922 B2
(45) Date of Patent: May 21, 2013

(54) CONTAINMENT DEVICE AND METHOD FOR CONTAINING ENERGY STORAGE DEVICES

(75) Inventors: Mori M. Borumand, Woodinville, WA (US); David A. Bowen, Bellevue, WA (US); Kevin O. Gaw, Tukwila, WA (US); Chris J. Johnson, Bow, WA (US)

(73) Assignee: The Boeing Company, Chicago, IL (US)

( * ) Notice: Subject to any disclaimer, the term of this patent is extended or adjusted under 35 U.S.C. 154(b) by 539 days.

(21) Appl. No.: 12/575,042

(22) Filed: Oct. 7, 2009

(65) Prior Publication Data

US 2011/0079456 A1    Apr. 7, 2011

(51) Int. Cl.
 *B60R 16/04* (2006.01)
(52) U.S. Cl.
 USPC ....................................................... 180/68.5
(58) Field of Classification Search
 USPC ............... 109/24, 27, 49.5, 62; 428/702, 174,
   428/698; 89/36.2, 1.1; 429/120, 245, 163,
   429/235, 221, 231.8; 180/68.5
 See application file for complete search history.

(56) References Cited

U.S. PATENT DOCUMENTS

| | | | | |
|---|---|---|---|---|
| 4,255,502 A | * | 3/1981 | Taylor, III | 429/163 |
| 4,496,637 A | * | 1/1985 | Shimada et al. | 429/498 |
| 4,840,855 A | * | 6/1989 | Foti et al. | 429/120 |
| 4,865,906 A | | 9/1989 | Smith, Jr. | |
| 4,889,258 A | * | 12/1989 | Yerushalmi | 89/1.1 |
| 5,225,622 A | * | 7/1993 | Gettle et al. | 89/36.02 |
| 5,249,534 A | * | 10/1993 | Sacks | 109/24 |
| 5,350,648 A | * | 9/1994 | Kagawa et al. | 429/221 |
| 5,795,680 A | * | 8/1998 | Ikeda et al. | 429/245 |
| 6,287,686 B1 | | 9/2001 | Huang et al. | |
| 6,341,708 B1 | | 1/2002 | Palley et al. | |
| 6,509,119 B1 | * | 1/2003 | Kobayashi et al. | 429/231.8 |
| 8,086,223 B2 | * | 12/2011 | Allen | 455/413 |
| 2003/0087982 A1 | * | 5/2003 | Kanazawa | 522/49 |
| 2005/0014061 A1 | * | 1/2005 | Ahn | 429/120 |
| 2006/0116043 A1 | | 6/2006 | Hope et al. | |
| 2006/0261304 A1 | | 11/2006 | Muthukumaran et al. | |
| 2007/0180688 A1 | * | 8/2007 | Kawakami et al. | 29/623.1 |
| 2008/0290094 A1 | | 11/2008 | Bruce | |
| 2009/0114082 A1 | * | 5/2009 | Hunn | 89/36.02 |
| 2009/0126557 A1 | * | 5/2009 | Hunn | 89/36.02 |
| 2010/0027920 A1 | | 2/2010 | Raidl et al. | |
| 2010/0196671 A1 | * | 8/2010 | Sorensen et al. | 428/174 |

OTHER PUBLICATIONS

PCT, International Search Report and Written Opinion, International Application No. PCT/US2010/044339 (Mar. 18, 2011).

* cited by examiner

*Primary Examiner* — Hau Phan
(74) *Attorney, Agent, or Firm* — Farid Piroozmandi

(57) ABSTRACT

A containment device including a cover defining an internal volume and an opening into the internal volume, the cover being formed as a layered structure including at least a first layer and a second layer, the first layer comprising a woven ceramic fabric and the second layer comprising oxidized polyacrylonitrile fibers.

12 Claims, 6 Drawing Sheets

CONTAINMENT DEVICE AND METHOD FOR CONTAINING ENERGY STORAGE DEVICES

FIELD

The present patent application relates to safety devices and methods for containing energy storage devices and, more particularly, to devices and methods for containing energy released from energy storage devices during thermal runaway.

BACKGROUND

High energy density energy storage devices are capable of storing relatively high amounts of electrical energy per unit mass. For example, lithium-ion batteries may be capable of providing 150 watts per kilogram of battery. In contrast, lead-acid batteries may only be capable of supplying 25 watts per kilogram of battery. Therefore, high energy density energy storage devices are particularly attractive when overall weight is a consideration, such as, for example, on commercial aircraft and personal electronics.

However, thermal runaway is a significant challenge with high energy density energy storage devices, such as lithium-ion batteries. During thermal runaway of a lithium-ion battery, the exothermic reactions generate high temperatures and pressures. Therefore, various restrictions have been placed on the use and transportation of energy storage devices that are likely to undergo thermal runaway.

Despite the associated challenges, the significant weight advantages of high energy density energy storage devices continue to drive demand for such energy storage devices. One prior approach to addressing the challenges associated with energy storage devices prone to thermal runaway includes the use of metal-based shielding to contain venting during an exothermic event. However, such shielding significantly increases overall weight. Another approach includes isolating the energy storage device from other equipment and powered devices, thereby requiring the need for extensive and heavy wiring to connect to the isolated energy storage device.

Accordingly, those skilled in the art continue to seek new ways for minimizing the hazards associated with energy storage devices.

SUMMARY

In one aspect, the disclosed containment device may include a cover defining an internal volume and an opening into the internal volume, the cover being formed as a layered structure including at least a first layer and a second layer, the first layer comprising a woven ceramic fabric and the second layer comprising oxidized polyacrylonitrile fibers.

In another aspect, the disclosed containment device may include a cover defining an internal volume and an opening into the internal volume, the cover being formed as a layered structure including at least a first layer and a second layer, the first layer comprising woven alumina borosilicate fibers and the second layer comprising oxidized polyacrylonitrile fibers and structural strengthening fibers, and a seal configured to engage the opening to enclose the internal volume.

In another aspect, a vehicle, which broadly refers to any type of mobile device or platform, may be configured in accordance with the present disclosure to include an energy storage device carried by the vehicle, the energy storage device being configured to supply electrical power to the vehicle, a cover defining an internal volume and an opening into the internal volume, the energy storage device being received in the internal volume, wherein the cover is formed as a layered structure including at least a first layer and a second layer, the first layer comprising woven alumina borosilicate fibers and the second layer comprising oxidized polyacrylonitrile fibers and structural strengthening fibers, and a seal configured to engage the opening to enclose the energy storage device within the internal volume.

In yet another aspect, the disclosed method for containing an energy storage device may include the steps of providing a cover that defines an internal volume and includes an opening into the internal volume, the cover being formed as a layered structure including at least a first layer and a second layer, the first layer comprising a woven ceramic fabric and the second layer comprising oxidized polyacrylonitrile fibers, positioning the energy storage device in the internal volume and, after the positioning step, sealing the opening.

Other aspects of the disclosed containment device and method for containing energy storage devices will become apparent from the following description, the accompanying drawings and the appended claims.

DETAILED DESCRIPTION

Figure 1:
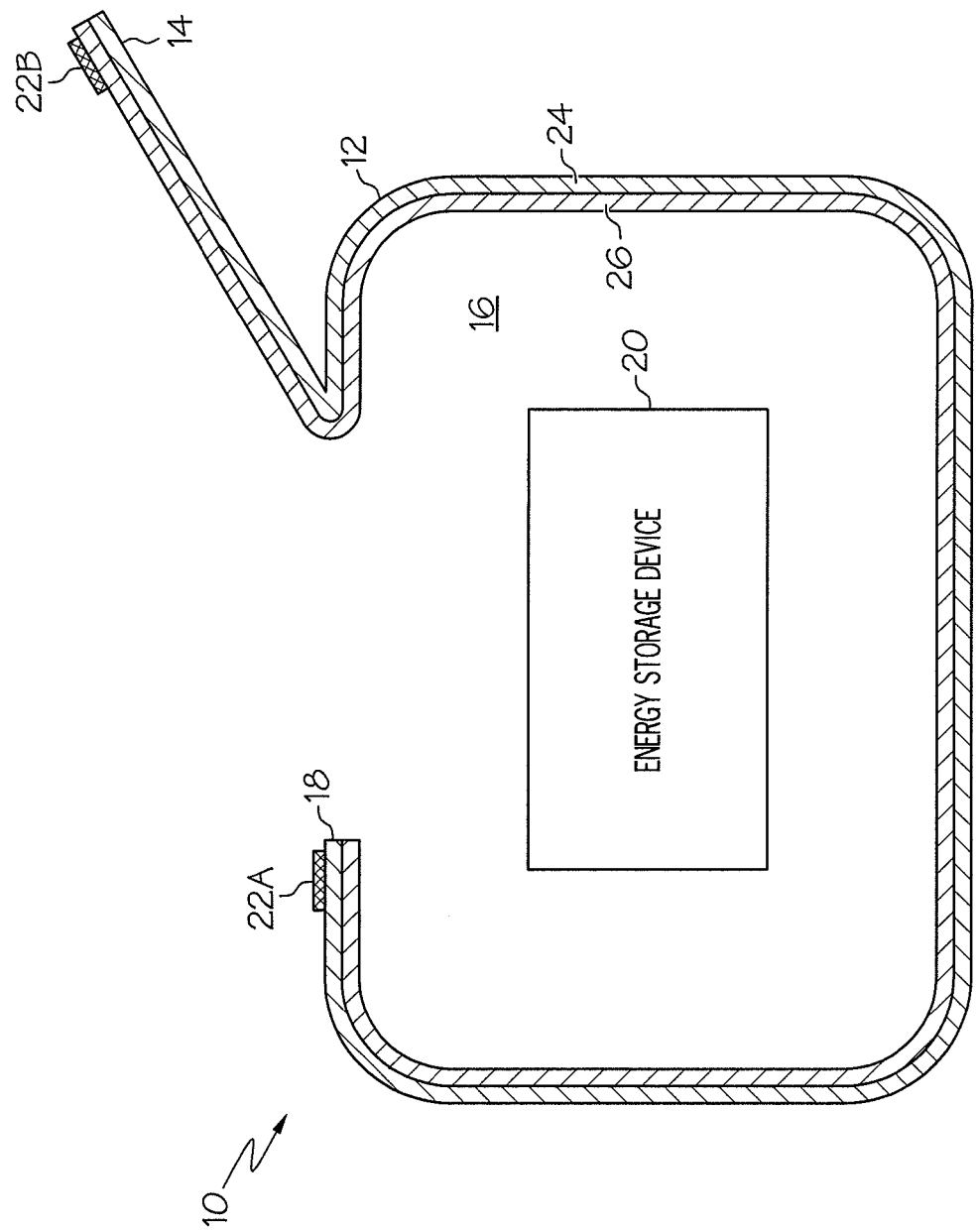
FIG. 1 is a schematic illustration of one aspect of the disclosed containment device for energy storage devices, shown in an open configuration.
Figure 2:
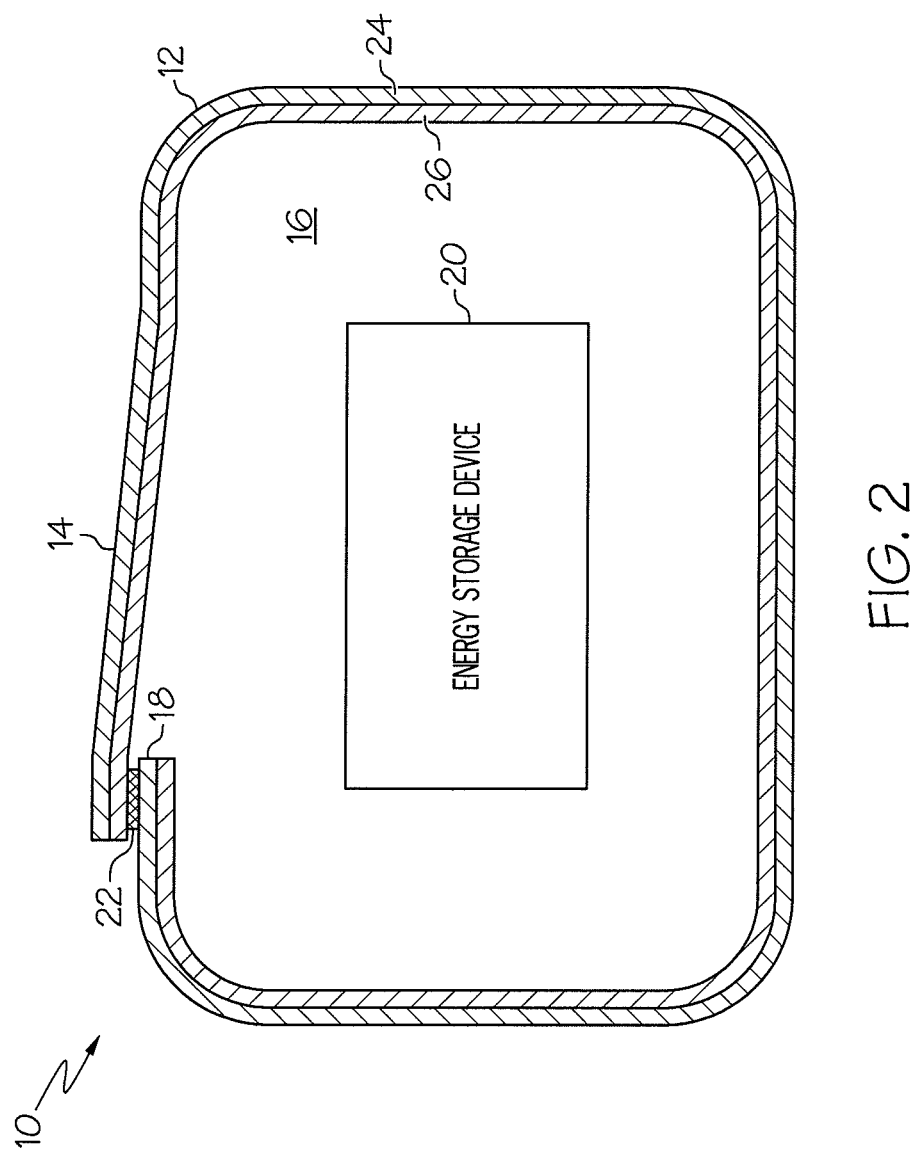
FIG. 2 is a schematic illustration of the disclosed containment device of FIG. 1, shown in a sealed configuration.

Referring to FIGS. 1 and 2, one aspect of the disclosed containment device for energy storage devices, generally designated 10, may include a protective cover 12 and a seal 14. The protective cover 12 may define an internal volume 16 and an opening 18 that may provide access to the internal volume 16. The seal 14 may be configured to seal the opening 18 such that an energy storage device 20 may be enclosed within the internal volume 16.

The opening 18 and seal 14 may be configured to allow wires or the like to extend through the opening 18 such that the energy storage device 20 may be discharged while it is enclosed in the containment device 10. Optionally, additional ports (not shown) may be provided through the protective cover 12 to facilitate electrical connections.

The energy storage device 20 may be any device capable of storing electrical energy, such as a battery. In one particular aspect, the energy storage device 20 may be a high energy density battery, such as a lithium-ion battery. In another particular aspect, the energy storage device 20 may be any battery that includes a Group 1 or 2 metal, such as lithium.

In one aspect, the seal 14 may be a flap configured to lay over the opening 18, as shown in FIGS. 1 and 2. An optional attachment mechanism 22 may be disposed between the seal 14 and the protective cover 12 to facilitate secure engagement between the seal 14 and the protective cover 12. For example, the attachment mechanism 22 may be a hook-and-loop fastener, wherein a first portion 22A of the hook-and-loop fastener is secured to the protective cover 12 and a second, corresponding portion 22B of the hook-and-loop fastener is secured to the seal 14. Other examples, of attachment mechanisms 22 for securing the seal 14 to the protective cover 12 include snaps, buttons and buckles.

Figure 3:
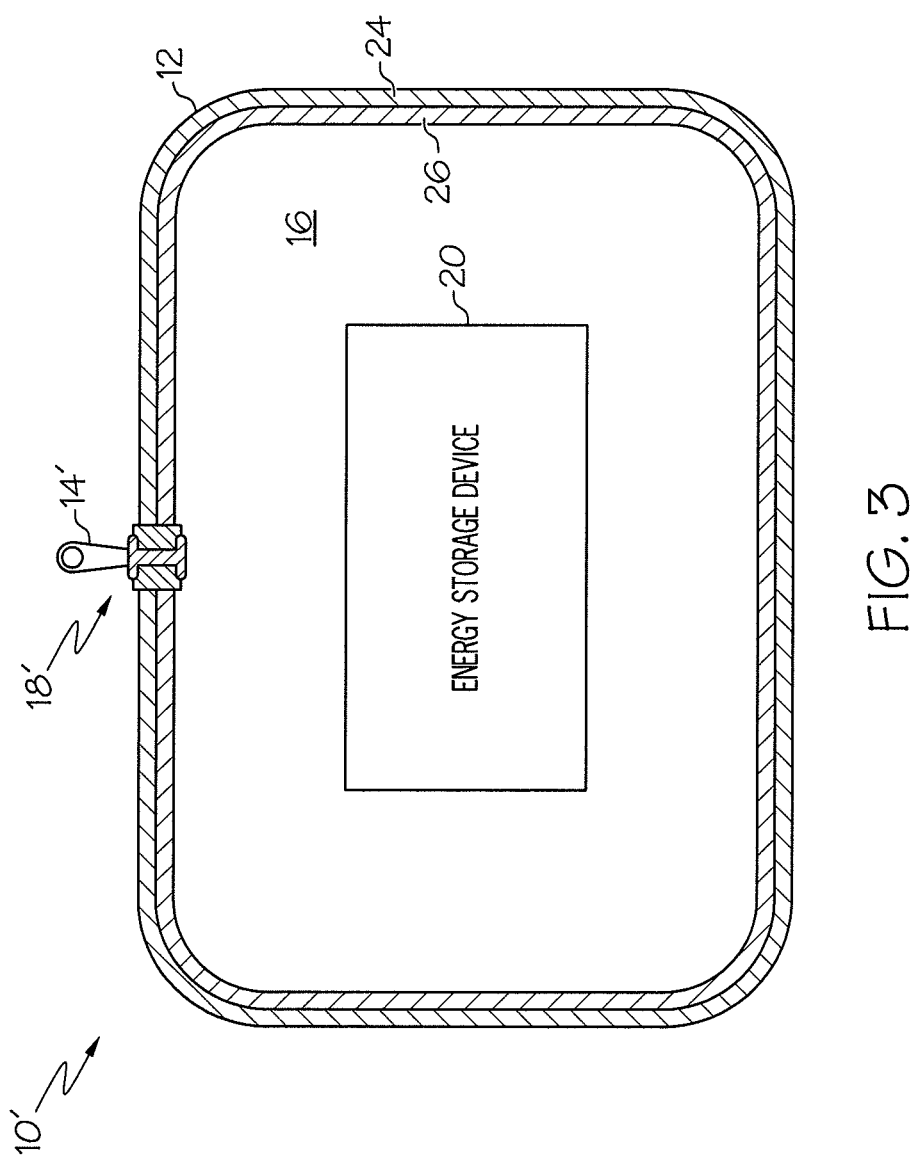
FIG. 3 is a schematic illustration of an alternative aspect of the disclosed containment device for energy storage devices, shown in a sealed configuration.

Referring to FIG. 3, in one alternative aspect, the seal 14' of the disclosed containment device 10' may be a zipper fastener that has been secured to the protective cover 12. Thus, the opening 18' may be formed when the zipper fastener is unzipped and the opening 18' may be sealed when the zipper fastener is zipped.

At this point, those skilled in the art will appreciate that the word "seal" broadly refers to any device or feature that is capable of sealing the opening 18 to the internal volume 16 defined by the protective cover 12 to inhibit egress of significant quantities of hot plasma, gases and debris should the energy storage device 20 within the containment device 10 experience an exothermic event.

The protective cover 12 may be constructed to have various shapes and geometries, which may be dictated by the size and shape of the internal volume 16 required to receive the energy storage device 20. The internal volume 16 may be constructed to be slightly larger than the energy storage device 20 to provide space for receiving plasma, gases and debris exiting the energy storage device 20 during an exothermic event. In one particular aspect, the protective cover 12 may be formed as a pouch by securing together, e.g., with stitching (CarbonX® fiber thread), two panels of the disclosed layered structure (discussed below). In a second particular aspect, the protective cover 12 may be formed as a three-dimensional rectilinear body by securing together multiple panels of the disclosed layered structure. Other shapes and geometries will become apparent to those skilled in the art upon reading the present disclosure.

Figure 4:
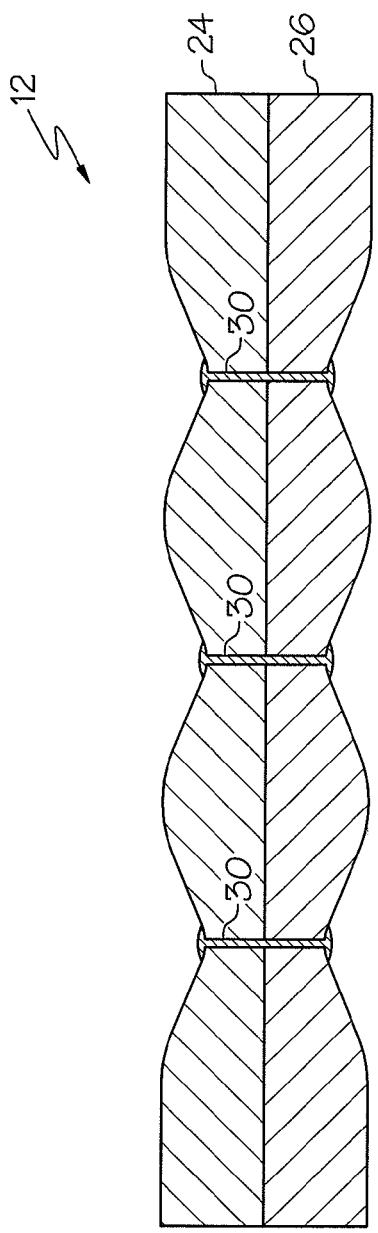
FIG. 4 is a cross-sectional view of a portion of the containment device shown in FIG. 2.
Figure 5:
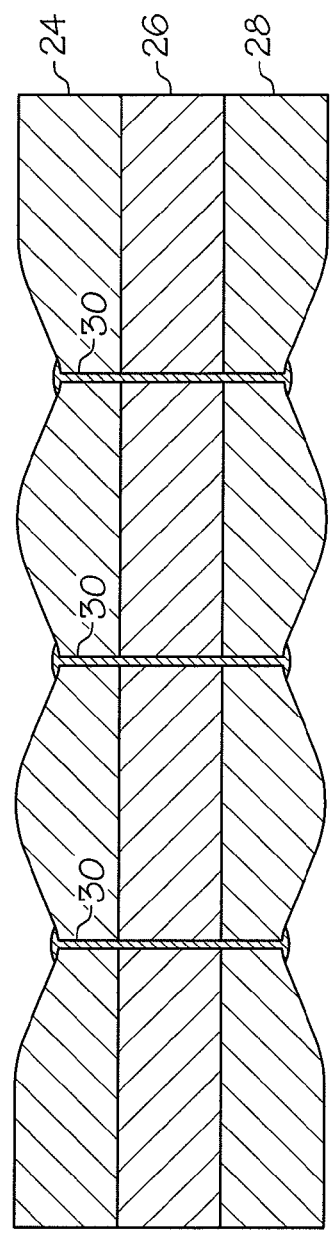
FIG. 5 is a cross-section view of a portion of a containment device in accordance with a another aspect of the present disclosure.

Referring now to FIG. 4, the protective cover 12 may be formed from a layered structure comprising at least a first layer 24 and a second layer 26. For example, the second layer 26 may be disposed between the first layer 24 and the internal volume 16. In one particular aspect, as shown in FIG. 5, the second layer 26 may be sandwiched between the first layer 24 and a third layer 28. At this point, those skilled in the art will appreciate that additional layers may be included by alternating, either regularly/uniformly or randomly, the various layers 24, 26, without departing from the scope of the present disclosure. In another particular aspect, the layered structure forming the protective cover 12 may include additional layers 24, 26 adjacent high-stress areas, such as areas having a high probability of experiencing venting, to provide the containment device 10 with additional structural reinforcement.

The first layer 24 may be formed from or may include a woven inorganic fabric, such as a woven ceramic fabric. In one aspect, the woven ceramic fabric may include woven alumina borosilicate fibers. For example, the first layer 24 may be formed from or may include NEXTEL™ woven fabric, available from 3M Company, Inc. of St. Paul, Minn. In one specific example, the first layer 24 may be formed from or may include NEXTEL™ Woven Fabrics 312.

The second layer 26 may be an organic, or organically-derived fabric. In one aspect, the second layer may be formed from or may include a fabric comprising oxidized polyacrylonitrile fibers and, optionally, one or more structural strengthening fibers. Examples of structural strengthening fibers include polybenzimidazole, polyphenylene-2,6-benzobisoxazole, modacrylic p-aramid, m-aramid, polyvinyl halides, wool, fire resistant polyesters, fire resistant nylons, fire resistant rayons, cotton and melamine. For example, the second layer 26 may be formed from or may include CarbonX® flame retardant fabric, available from Chapman Thermal Products, Inc. of Salt Lake City, Utah. Other exemplary materials that may form or be included in the second layer 26 are described in U.S. Pat. No. 6,287,686, the entire contents of which are incorporated herein by reference. In one specific example, the second layer 26 may be formed from or may include CarbonX® C-59 flame retardant fabric.

The third layer 28 may be formed from the same or similar material from which the first layer 24 is formed.

Without being limited to any particular theory, it is believed that the use of woven ceramic fabric, such as NEXTEL™ woven fabric, imparts the layered structure of the protective cover 12 with mechanical strength and high temperature resistance. Furthermore, without being limited to any particular theory, it is believed that the use of fabrics formed from oxidized polyacrylonitrile fibers, such as CarbonX® flame retardant fabric, imparts the layered structure of the protective cover 12 with additional high temperature resistance, as well as gas diffusion resistance. Accordingly, without being limited to any particular theory, it is believed that a protective cover 12 having at least the first and second layers 24, 26 described above can contain an exothermic event by allowing gases to vent through the fabric pores, but not in concentrated plumes or plasmas, while containing hot, high velocity debris.

Referring to FIGS. 4 and 5, the layers 24, 26, 28 forming the protective cover 12 may be secured together with stitches 30, which may provide the protective cover 12 with a quilted layered structure. The stitches 30 may be formed from heat-resistant thread, such as CarbonX® fiber thread. At this point, those skilled in the art will appreciate that the layers 24, 26, 28 forming the protective cover 12 may be secured together using techniques other than stitching, such as thermal adhesives.

Figure 7:
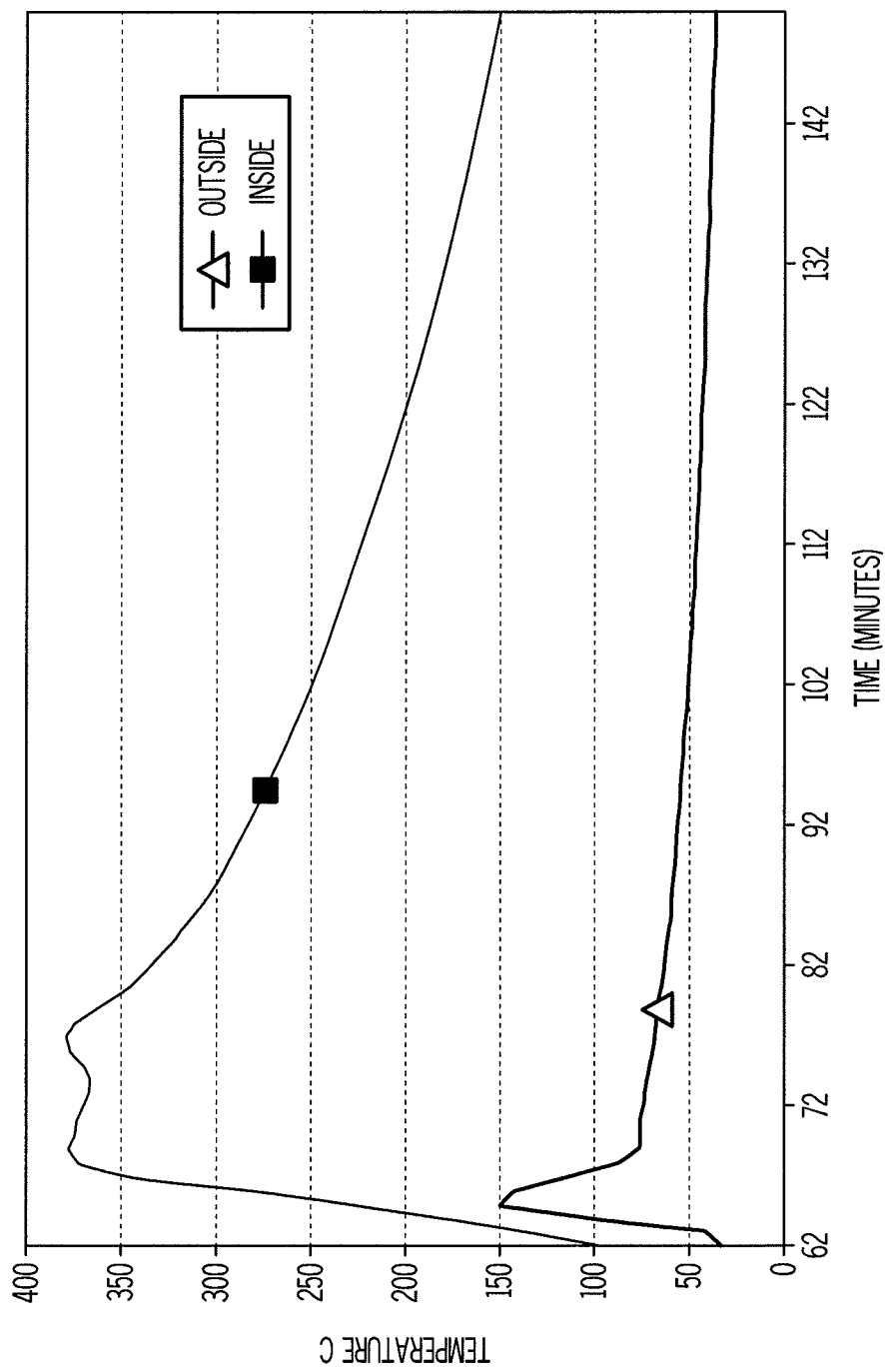
FIG. 7 is a graphical illustration, of the inside and outside temperatures of an exemplary containment device housing an energy storage device undergoing a thermal runaway.

One exemplary containment device 10 was prepared as a rectilinear box from a layered structure that included a layer of CarbonX® C-59 flame retardant fabric positioned between two layers of NEXTEL™ Woven Fabrics 312. Panels of the layered structure were stitched together on an industrial walking-foot sewing machine using a double row of CarbonX® thread at 10 stitches per inch. Battery terminal ports were formed in the containment device and a 50 amp-hour lithium ion battery cell was inserted into the internal volume. The battery terminals were electrically coupled to a test machine by way of the ports in the cover and a thermal runaway was initiated. During venting, the battery cell expulsed flame and about 1 pound of electrolyte material as a high temperature gas plume, which caused the containment device to bulge. However, the seams and the fabric held and, as shown in FIG. 7, the containment device 10 limited the temperature external of the cover to a peak temperature of about 150° C. for only a few minutes, while the temperature within the cover peaked at about 375° C. and remained elevated for a much greater amount of time.

Figure 6:
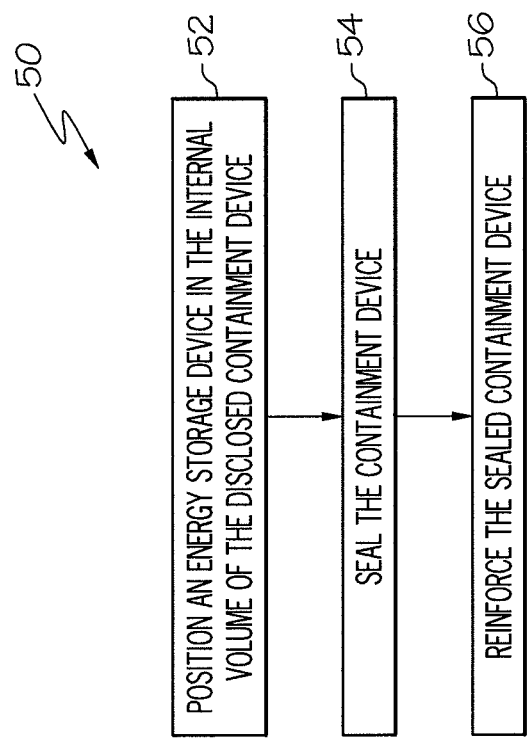
FIG. 6 is flow chart illustrating one aspect of the disclosed method for containing an energy storage device.

Accordingly, referring to FIG. 6, one aspect of the disclosed method for containing an energy storage device, generally designated 50, may include the steps of positioning the energy storage device in the internal volume of the disclosed containment device, as shown in block 52. Then, the containment device may be sealed, as shown in block 54. Optionally, after sealing, the containment device may be reinforced, as shown in block 56. One exemplary technique for reinforcing the sealed containment device includes wrapping straps or belts (e.g., Kevlar belts) around the sealed containment device. Another exemplary technique for reinforcing the sealed containment device includes wrapping the sealed containment device with Kevlar mesh.

Accordingly, the disclosed containment device and method may provide a relatively low cost and lightweight approach for containing the high pressures and hot plasmas, gases and debris venting from an energy storage device during an exothermic event, thereby minimizing collateral damage to the surround external environment (e.g., a vehicle carrying the disclosed containment device and associated energy storage device). Furthermore, the disclosed containment device and method may provide a relatively low cost and lightweight approach for protecting the contained energy storage device from external thermal events.

Although various aspects of the disclosed containment device and method for containing energy storage devices have been shown and described, modifications may occur to those skilled in the art upon reading the specification. The present application includes such modifications and is limited only by the scope of the claims.

What is claimed is:

1. A containment device for an energy storage device, the containment device comprising a box defining an internal volume and an opening into said internal volume, said box being formed as a layered structure including at least a first layer and a second layer inside said first layer, said first layer consisting of a woven ceramic fabric and said second layer consisting of oxidized polyacrylonitrile fibers.

2. The containment device of claim 1 further comprising a seal around said opening, said internal volume being enclosed when said seal seals said opening.

3. The containment device of claim 2 wherein said seal includes a flap, said flap being formed from said layered structure.

4. The containment device of claim 2 wherein said seal includes a zipper fastener.

5. The containment device of claim 1 wherein said second layer is positioned between said first layer and a third layer, said third layer comprising said woven ceramic fabric.

6. The containment device of claim 1 wherein said first layer is connected to said second layer by stitching.

7. The containment device of claim 1 wherein said woven ceramic fabric comprises alumina borosilicate fibers.

8. The containment device of claim 1 wherein said second layer further comprises structural strengthening fibers.

9. The containment device of claim 8 wherein said structural strengthening fibers are selected from the group consisting of polybenzimidazole, polyphenylene-2,6-benzobisoxazole, modacrylic p-aramid, m-aramid, polyvinyl halides, wool, fire resistant polyesters, fire resistant nylons, fire resistant rayons, cotton, melamine and combinations thereof.

10. The containment device of claim 1 wherein second layer consists essentially of said oxidized polyacrylonitrile fibers and aramid fibers.

11. The containment device of claim 1 further comprising an energy storage device received in said enclosed volume.

12. The containment device of claim 11 wherein said energy storage device includes a lithium-ion battery.

* * * * *